(12) United States Patent
Patrikios et al.

(10) Patent No.: US 8,113,258 B2
(45) Date of Patent: Feb. 14, 2012

(54) ULTRASONIC WELDING DEVICE

(75) Inventors: Mike Patrikios, Milford, CT (US); Andrew Rushton, New Milford, CT (US)

(73) Assignee: Sonics & Materials Inc., Newtown, CT (US)

( * ) Notice: Subject to any disclaimer, the term of this patent is extended or adjusted under 35 U.S.C. 154(b) by 395 days.

(21) Appl. No.: 12/498,889

(22) Filed: Jul. 7, 2009

(65) Prior Publication Data

US 2010/0006235 A1    Jan. 14, 2010

Related U.S. Application Data

(60) Provisional application No. 61/078,826, filed on Jul. 8, 2008.

(51) Int. Cl.
*B32B 37/00* (2006.01)

(52) U.S. Cl. .................. 156/580.2; 156/580.1

(58) Field of Classification Search ............ 156/73.1, 156/555, 580.1, 580.2, 582; 228/1.1, 110.1; 264/442, 443, 444, 445; 425/174.2
See application file for complete search history.

(56) References Cited

U.S. PATENT DOCUMENTS

| | | |
|---|---|---|
| 2,891,178 A | 6/1959 | Elmore |
| 3,955,740 A | 5/1976 | Shoh |
| 4,610,750 A | 9/1986 | Mango |
| 4,799,614 A | 1/1989 | Welter et al. |
| 4,867,370 A | 9/1989 | Welter et al. |
| 5,590,866 A | 1/1997 | Cunningham |
| 5,772,100 A | 6/1998 | Patrikios |
| 5,976,316 A | 11/1999 | Mlinar et al. |
| 6,070,777 A | 6/2000 | Patrikios et al. |
| 6,109,502 A | 8/2000 | Sato |
| 6,173,878 B1 | 1/2001 | Stroh |
| 6,247,628 B1 | 6/2001 | Sato et al. |
| 6,299,052 B1 | 10/2001 | Wnek et al. |
| 6,547,903 B1 * | 4/2003 | McNichols et al. ............ 156/64 |
| 6,676,003 B2 | 1/2004 | Ehlert et al. |
| 6,786,383 B2 | 9/2004 | Stegelmann |
| 6,786,384 B1 | 9/2004 | Haregoppa |
| 6,841,921 B2 | 1/2005 | Stegelmann |
| 7,523,775 B2 * | 4/2009 | Matsumura ................. 156/359 |
| 7,766,067 B2 * | 8/2010 | Voss ........................... 156/580.2 |
| 2006/0144906 A1 | 7/2006 | Sheehan et al. |

FOREIGN PATENT DOCUMENTS

JP      11254153 A    9/1999

* cited by examiner

*Primary Examiner* — James Sells
(74) *Attorney, Agent, or Firm* — St. Onge Steward Johnston & Reens LLC

(57) ABSTRACT

An ultrasonic welding assembly is disclosed. The assembly includes an ultrasonic welder having nodal horn support for improving transmission of transducer energy to the weld comprising an acoustical tool having a horn; a weld tip on the end of said horn; and at least two nodal mounts which are in contact with and axially and radially support said horn. The horn self-aligns in housing by sitting a housing-key within a keyway in the horn. The weld tip self aligns by sitting the keyed tip in a keyway of the horn.

19 Claims, 4 Drawing Sheets

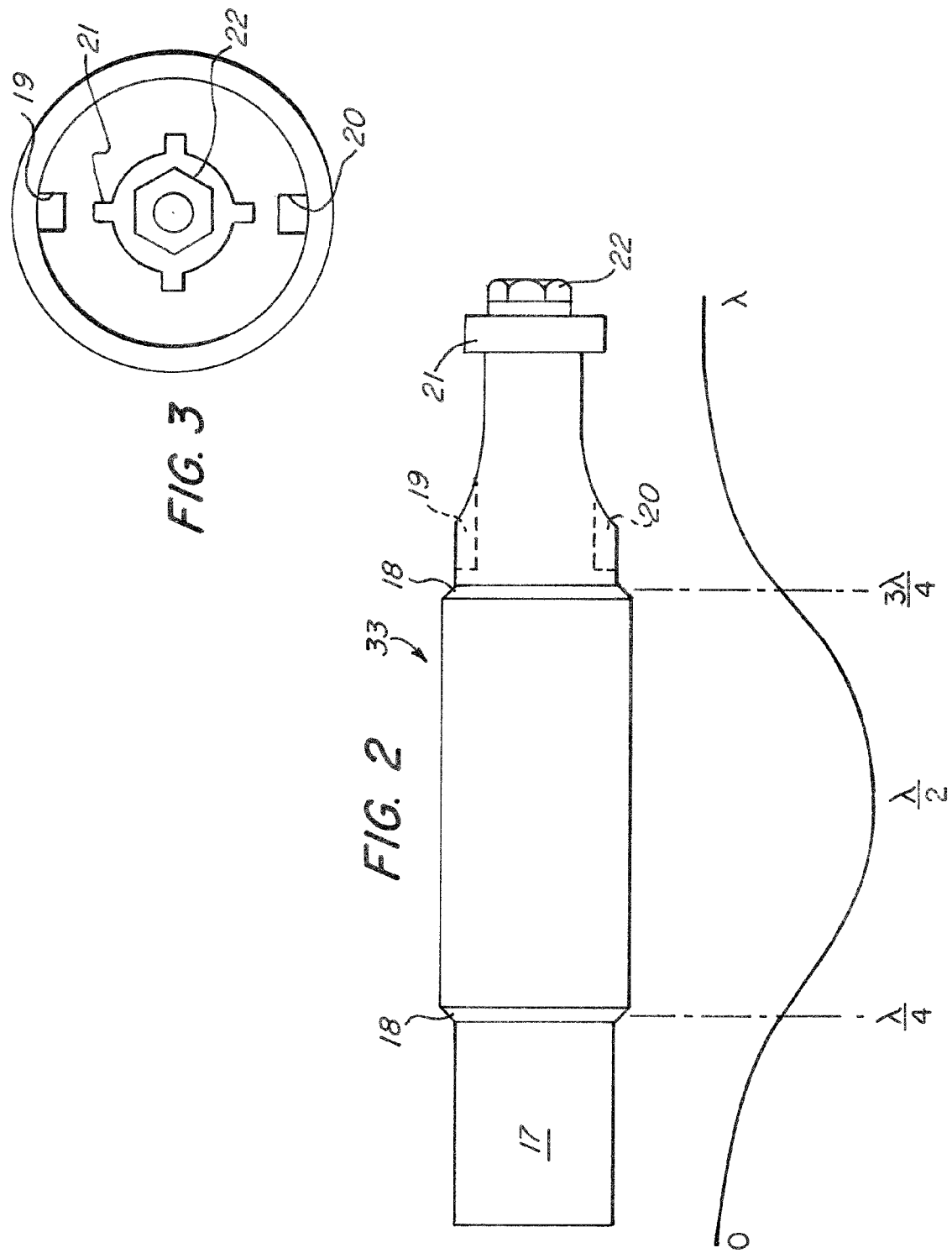

ULTRASONIC WELDING DEVICE

CROSS-REFERENCE TO RELATED APPLICATIONS

Applicant claims priority benefits under 35 U.S.C. §119(e) of U.S. Provisional Patent Application Ser. No. 61/078,826 filed Jul. 8, 2008.

FIELD OF THE INVENTION

The present invention relates to an ultrasonic welding apparatus and more particularly to an improved method of mounting an ultrasonic stack and weld tip.

BACKGROUND OF THE INVENTION

Ultrasonic welding uses high frequency ultrasonic acoustic vibrations to hold materials together. Such systems contain an ultrasonic horn assembly having a number of distinct components, which are connected in a stack. Common configurations include a converter to convert electrical signal into a mechanical vibration, a booster to modify the amplitude of the vibration, and a horn to apply mechanical vibrations to the parts to be welded. In standard systems the booster is also used to clamp the stack into a press.

The most typical mounting method for an ultrasonic stack is supporting the horn, preferably at its nodal point, in order to prevent loading of the tip by the anvil from deflecting the horn off the transducer axis. Several nodal mounting means have been devised such as set screws, clamps, and spring mounting. With such mounting systems, the horn deflects when weld force is applied causing the interface between the horn and anvil to hinge open. This results in loss of energy transmission and a loss of positional accuracy. Additionally, the horn has no radial orientation feature because it is screwed onto the booster. A skilled technician with special set up tools is therefore required to accurately orient the horn.

Another disadvantage of the prior art lies in the lack of accuracy and rigidity of the weld position. In many applications such as wire splicing and wire termination, the position of the weld tip must be maintained within 3 microns (0.001 inches). This is not possible to achieve under full load of prior mounting systems. For example, U.S. Pat. No. 4,610,750 to Branson Ultrasonics Corp. shows a replaceable tip mounted onto the tapered end of a round horn. A problem with this design is limited access to weld larger components due to interferences with the body of the horn.

What is desired, therefore, is an ultrasonic welder where the body is nodally and radially mounted, and also is self-aligning with respect to the housing. A self-positioning horn with a replaceable, self-aligning weld tip is also desired.

SUMMARY OF THE INVENTION

Accordingly, it is an object of the invention to disclose nodal support for an ultrasonic welder that exerts radial forces and, in addition, exerts equal and opposite axial forces upon the welder through forces applied to the nodal support to decrease deflection of the horn and increase energy transmission to the weld.

Another embodiment of the invention is to disclose a housing for an ultrasonic welder having axial and radial nodal support wherein the housing provides axial support and converts axial force to radial force in order to decrease deflection of the horn and increase energy transmission to the weld.

A further object of the invention is to disclose a self-aligning ultrasonic welder having axial and radial nodal support and axial and radial support from a housing that will diminish longitudinal displacement, improve transmission of energy to the weld, and eliminate timely set up.

Yet another object of the invention is to provide a self-aligning weld-tip for an ultrasonic welder having axial and radial support to maintain rigidity of the weld position within 3 microns.

In one embodiment of the invention at least two nodal mounts having slanted faces are coupled to the welder and exert radial forces as well as equal and opposite axial forces upon the welder through forces applied to the slanted faces of nodal mounts. A full wave acoustical tool and semi-rigid nodal mounts are utilized. A keyway that is useful to secure the tool within housing is provided in the ultrasonic welder having at least two nodal mounts having slanted faces which exert radial and axial support.

In another embodiment of the invention, a bushing exerts axial forces on an ultrasonic welder having a keyway for securing the tool and having at least two nodal mounts which provide radial forces and, in addition, exert equal and opposite axial forces upon the welder. The bushing abuts a face of the nodal mounts converting at least some of the bushing's axial force into radial force.

In yet another embodiment of the invention, a key in the weld tip fits into a keyway in the horn of an ultrasonic welder having at least two nodal mounts having slanted faces which are coupled to the welder and which exert radial forces and also equal and opposite axial forces upon the welder through forces applied to the slanted faces.

In a further embodiment of the invention, an ultrasonic welder having a cantilevered weld zone and dynamic nodal horn support is set inside a housing. The housing provides equal and opposite axial support for the welder by exerting force on the slanted faces of nodal mounts positioned at $\lambda/4$ and $3\lambda/4$ of a full wave acoustical tool.

In still another embodiment of the invention, a key is set in a housing of an ultrasonic welder having a cantilevered weld zone and dynamic nodal horn support which provides axial support for the welder, to self-align the welder within a keyway in the horn.

In a further embodiment, a bushing abuts the slanted faces of nodal mounts on an ultrasonic welder having a cantilevered weld zone and dynamic nodal horn support for improving transmission of transducer energy to the weld. The bushing converts some of the axial forces applied to the stack into radial forces, thus exerting more axial force to secure the stack.

Still another embodiment of the invention provides a self-aligning ultrasonic welder having axial and radial support with a self-aligning weld tip. Keys in a housing and the weld tip fit into keyways in the stack. The welder is a full wave tool. A bushing exerts axial forces on the horn. The bushing provides radial support by exerting force on the slanted faces of nodal mounts thereby converting some of the axial forces into radial forces.

Thus, the present invention discloses mounting means for the acoustical tool of an ultrasonic welder. The tool is provided at its nodal region with a radially extending mounts that are coupled to the tool. At least two such nodal mounts are present so they provide opposite and equal forces. The surface of a housing or bushing exerts force on the nodal mounts. The tool contains a keyway for entry of a keyed member provided in the housing. Additionally, the horn of the tool contains a channel having one or more keyways. A weld tip having coordinating key(s) fits into the channel and keyway of the horn.

Further and still other objects of this invention will become more clearly apparent from the following description when taken in conjunction with the accompanying drawings.

BRIEF DESCRIPTION OF THE DRAWINGS

FIG. 2 shows a side view of a representative apparatus that may incorporate the present invention;

FIG. 3 shows a front view of the ultrasonic welder that may embody the present invention;

DETAILED DESCRIPTION OF THE INVENTION

The mounting means described hereafter is particularly suited for mounting a full wave acoustical tool with rigid nodal mounts and a cantilevered weld zone. In a typical industrial apparatus the frequency is in the ultrasonic range, and the apparatus includes a stack of three members, namely a converter, booster, and horn. The booster and horn may be connected at an interface by various means, or a "booster horn" in which the booster and horn are fused together may be employed to transfer vibrations to a weld tip. See e.g. U.S. Pat. No. 7,786,383 to Stegelmann, incorporated herein by reference. Often, in addition to functioning as a mechanical impedance transformer, the booster horn serves as a means for mounting the stack in a stationary housing. The following description describes the mounting means in connection with a booster horn, although the invention is applicable to other vibration members.

Figure 1:
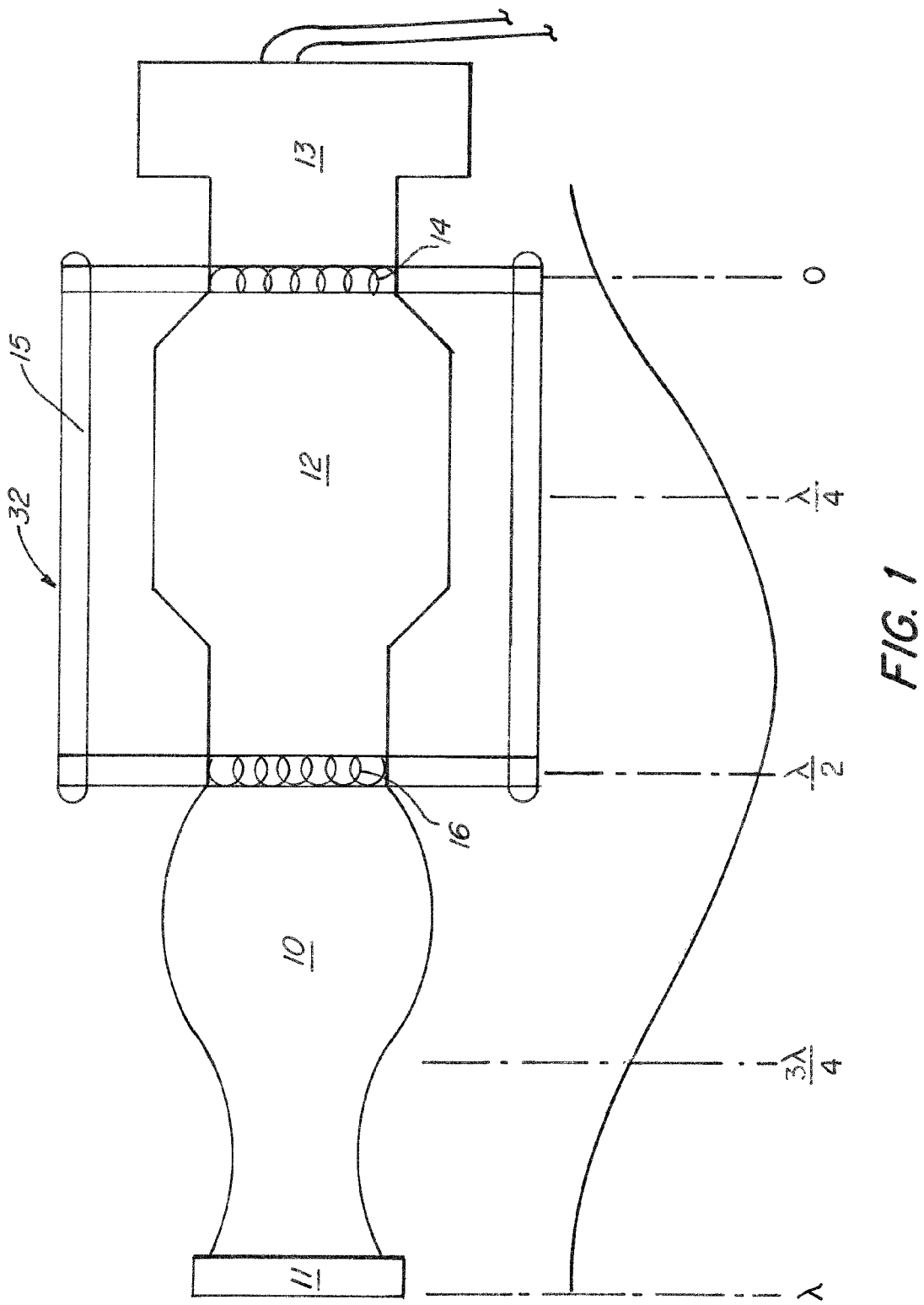
FIG. 1 shows basic representation of an ultrasonic welder employing typical mounting means described in the prior art.

Referring now to the drawing figures and in particular FIG. 1, there is shown an ultrasonic welder 32 with mounting means common in the prior art. Welder 32 is an acoustical tool that comprises a horn 10, a weld tip 11, a booster 12 for amplifying and subsequently inducing vibrations into the acoustical tool, and a converter 13 for converting electrical impulses to mechanical oscillations via a piezo electric assembly. The combination of horn 10, booster 12, and converter 13 is also referred to as the "stack."

The mounting of welder system 32 is along the plane of maximum amplitude where the stack is fastened to a mounting shell 15 via a frontal diaphragm spring 16 and a rear diaphragm spring 14. The springs 14 and 16 isolate the vibrations. However, horn 10 may deflect when weld force is applied to tip 11, causing the interface between the horn 10 and an anvil (not pictured) to hinge open, resulting is a loss of energy transmission from the stack to the object to be welder. Positional accuracy of the tip 11 is also compromised.

Figure 6:
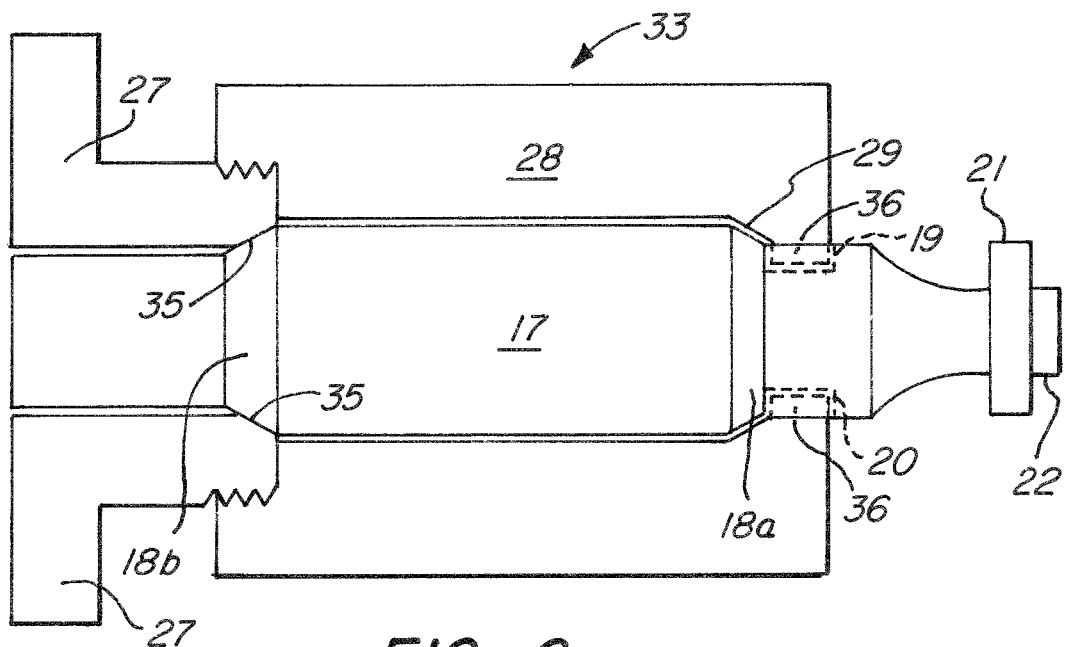
FIG. 6 shows an exploded view of a housing that may embody the present invention, and within the housing a side view of a stack of the present invention.
Figure 7:
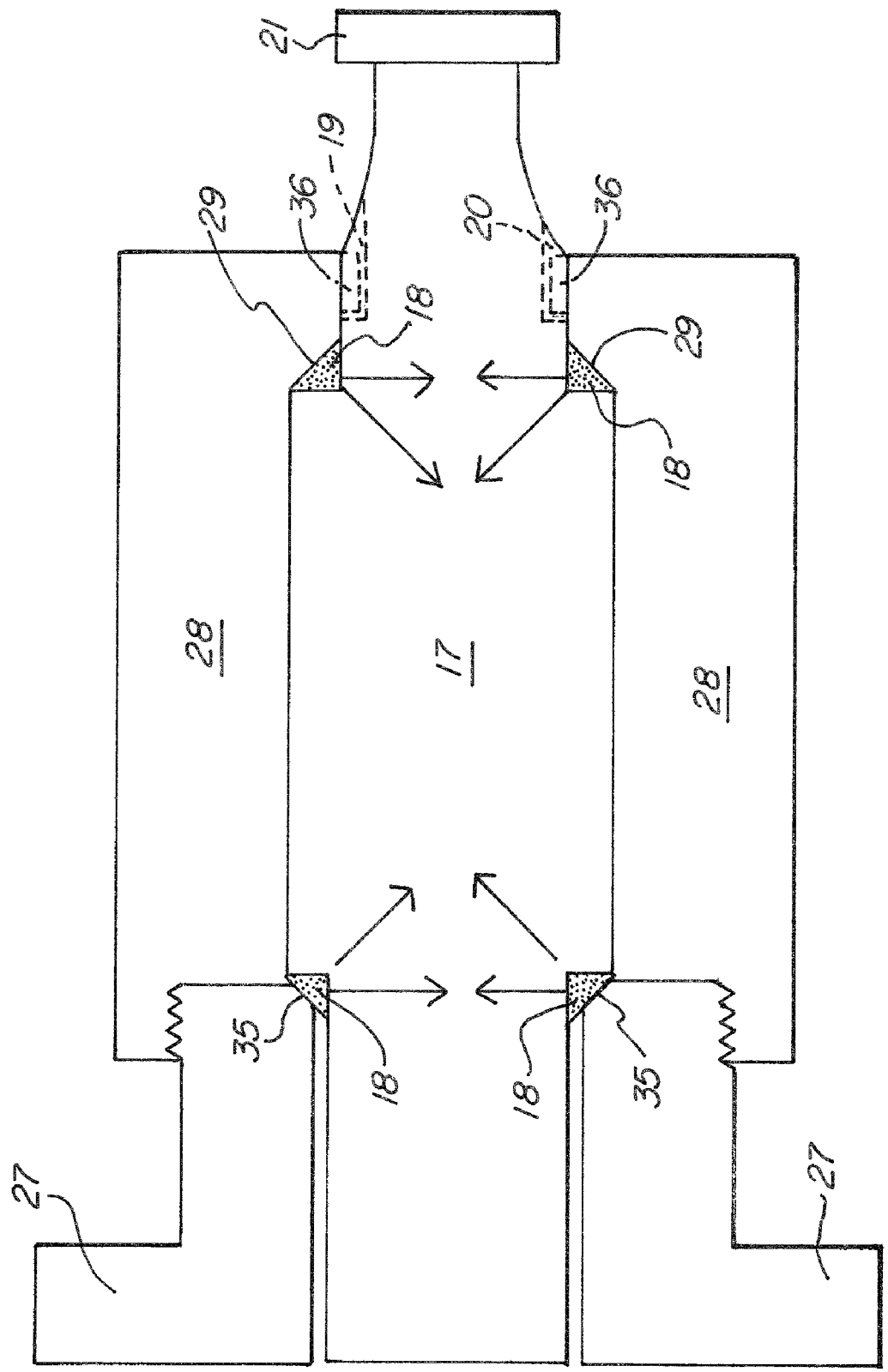
FIG. 7 is a cross section of FIG. 2 having mounting means that may incorporate the present invention.

Referring to FIGS. 2, 6 and 7, an ultrasonic welder 33 in accordance with the invention is depicted. Welder 33 comprises a booster horn 17, nodal mounts 18 for mounting the booster horn 17 and dampening vibrations, a weld tip 21, and nut 22 which helps secure the weld tip 21 to the booster horn 17. The booster horn 17 contains an upper keyway 19 and lower keyway 20 that assist in positioning the booster horn 17 in a stationary housing. The use of a booster horn 17 is preferred since there is greater efficiency of transmitting ultrasonic energy along the axis of the acoustical tool from a converter (not pictured) to the weld tip due to the elimination of the interface between the horn and booster. Thus, no hinge separation of the interface is observed when radial weld force is applied reducing the efficiency energy transmission and eventually damaging the interface.

The welder may have multiple nodal mounts 18. A node is a point or region on an ultrasonic horn where the displacement is negligible or zero. Preferably, the nodal mounts are positioned at $\lambda/4$ and $3\lambda/4$ of a full wave acoustical tool. The mounts 18$a$ and 18$b$ radially resist deflection. Moreover, the mounts 18$a$ and 18$b$ force the stack components to oppose each other axially and help prevent the housing from moving.

Mounts 18$a$ and 18$b$ are depicted as frusto-conical, but may be of any shape so that they may be coupled to the surface of the booster horn 17. Coupled means that the respective elements are linked or connected together, but not necessarily in direct physical contact. The mounts 18 contain a slanted face or tapered bearing. They may be constructed of various materials such as flexible metal, elastomeric polymers, or rigid metal, all discussed in U.S. Pat. No. 5,590,866 to Cunningham, incorporated herein by reference. Mounts constructed of a semi-rigid material are preferred. For example, glass filled nylon is used because it may achieve intimate contact with the tool 17 and a tapered bearing is easily cut into it.

In FIG. 1, the stack is mounted at 0 and $\lambda/2$, the points of maximum amplitude by diaphragm springs 14 and 16. These springs require an axially flexible seating. However, the welder of the present invention provides mounts 18 at $\lambda/4$ and $3\lambda/4$, the points of zero amplitude. Thus, maximum amplitude can be applied to the weld in the present invention. Moreover, the occurring radial and axial forces, as well as bending moments, and possibly torsion moments, caused by welding can be absorbed.

Further, mounts 18 of FIG. 2 are of much different shape and construction than those of FIG. 1. FIG. 1 depicts springs 14 and 16 that are typically statically stiff, contain multiple components, and resonate at the frequency of the horn. The mounts 18 of FIG. 2 are one piece and are coupled to and often intimately contact the welder. The mounts 18 force components opposite each other and help resist deflection. The mounts 18 also help prevent housing from moving, as opposed to allowing the tool to move, as in welder 32 of FIG. 1. In welder 33, an embodiment of the present invention, there is a slanted face of the mount (better depicted in FIG. 6) that helps to achieve intimate contact with a housing member and helps secure the tool 17 in multiple directions at multiple points.

Referring to FIG. 6, booster horn 17 is surrounded by housing 28, which accommodates and secures the acoustical tool. The housing may be constructed of any durable material suitable to secure the acoustical tool. The housing 28 contains one or more housing keys 36. The key 36 is meant to fit into the keyway 19 to align the tool in the housing. It is preferable to have at least a second keyway 20 in the acoustical tool. The housing may also have a surface 29 that matches the taper of the nodal mounts. The housing applies axial force to the acoustical tool through this surface 29 in order to secure the tool 17 within the housing 28. Because the taper in the housing surface 29 matches that of the mount 18, in can intimately contact the nodal mount 18 converting some of the axial force to radial forces.

Bushing 27 is used to secure the housing assembly 28. FIG. 3 depicts a threaded insert that fixes the bushing to the housing 28; however the type of bushing 27 may be of any type and material commonly used in the art. The bushing 27 is preferably screwed into the housing 28 creating high clamping forces in the axial direction. Further, the bushing 27 has a surface 35 that abuts and exerts force on the slanted face of the nodal mount 18. The longitudinal force created by screwing the bushing 27 to the housing 28 is exerted onto booster horn 17 by abutting the bushing to a surface of the tool. Preferably, the bushing abuts the nodal mount 18. Thus, some of the axial force is converted into radial force by contact of the bushing with the tapered face of the mount, further securing the tool. The longitudinal or axial forces created by the bushing 27 on the rear nodal mount 18b are opposite to the forces applied by the housing surface 29 to the nodal mount 18a. The opposing application of axial force ensures minimal longitudinal displacement of the booster horn 17.

Figure 4:
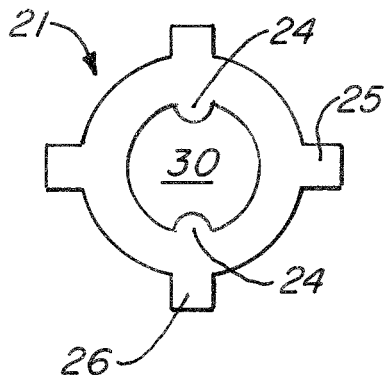
FIG. 4 shows frontal view of a representative weld tip.
Figure 5:
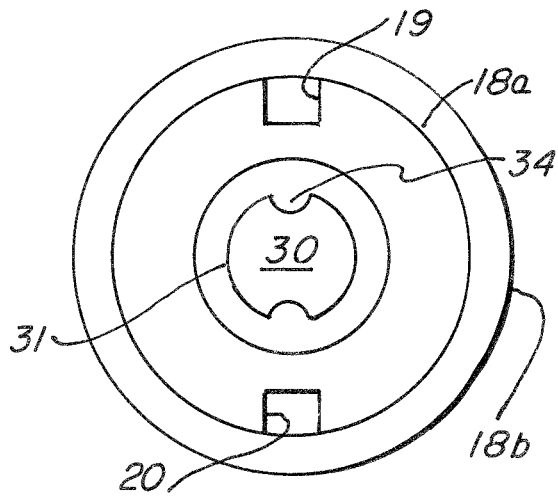
FIG. 5 shows a front perspective view of the booster horn that may incorporate the present invention.

Referring now to FIGS. 3, 4 and 5, the weld tip 21 is secured to the booster horn 17 by a nut 22. The weld tip 21 has a tip center 30 that is adaptable to the booster horn 17. The tip 21 may contain multiple weld surfaces such as a medium knurl 26 and a course knurl 25. The weld surface utilized is positioned by way of one or more tip key(s) 24. The tip keys 24 fit into corresponding keyways 34 of the key channel 31 located in the booster horn 17. The tool depicted has two tip keys and tip keyways, however less or more may be utilized. By fitting snuggly in the keyways 34, the keys 24 help to align the tool and prevent tip displacement. This is especially important in applications such as wire splicing and wire termination, where the position of the weld tip must be maintained within three microns. The tool of the present invention was able to maintain this accuracy under full load.

In addition to the tip key 24 and keyway 34, the tip 21 is secured by a nut 22. The booster horn may contain a threading in the tip center 30. Securing means are not limited to nut 22 and other means of securing the weld tip 21, such as an external screw or bolt that may fit into tip center 30, are contemplated by the invention.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An ultrasonic welder having nodal horn support for improving transmission of transducer energy to the weld comprising:
    an acoustical tool having a horn;
    a weld tip on the end of said horn; and
    at least two nodal mounts having a slanted face coupled to the welder;
    wherein said nodal mounts exert radial forces and, in addition, exert equal and opposite axial forces upon the welder through forces applied to the slanted faces of the mounts.

2. The ultrasonic welder of claim 1, wherein the acoustical tool is a full wave acoustical tool.

3. The ultrasonic welder of claim 1, wherein the nodal mounts are semi-rigid.

4. The ultrasonic welder of claim 1, wherein the tool has at least one keyway.

5. The ultrasonic welder of claim 4, further comprising a housing member.

6. The ultrasonic welder of claim 5, wherein the housing comprises bushing which exerts axial forces on the acoustical tool.

7. The ultrasonic welder of claim 6, wherein the bushing exerts force on a face of the nodal mount converting at least some of the axial force into radial force.

8. The ultrasonic welder of claim 4, wherein the weld tip self aligns by having a key that fits into said keyway.

9. An ultrasonic welder having a cantilevered weld zone and dynamic nodal horn support for improving transmission of transducer energy to the weld comprising:
    an acoustical tool having a horn;
    a weld tip on the end of said horn;
    at least two nodal mounts which exert radial forces upon said acoustical tool; and
    a housing member;
    wherein said housing member provides axial force on said tool by exerting force on a face of said nodes and thereby converting some of the axial forces into radial forces.

10. The ultrasonic welder of claim 9, wherein the acoustical tool is a full wave acoustical tool.

11. The ultrasonic welder of claim 9, wherein said nodal mounts are located at $\lambda/4$ and $3\lambda/4$.

12. The ultrasonic welder of claim 11, wherein the tool contains at least one keyway.

13. The ultrasonic welder of claim 9, wherein the housing member further comprises bushing.

14. The ultrasonic welder of claim 13, wherein a surface of the bushing exerts force on a face of the nodal mount converting some of the axial forces into radial forces.

15. The ultrasonic welder of claim 12, wherein the housing contains at least one key that fits into said keyway and self-aligns the tool.

16. A self-aligning ultrasonic welder having dynamic nodal horn support for improving transmission of transducer energy comprising:
    an acoustical tool having a horn with at least one keyway;
    a weld tip having a key on the end of said horn;
    at least two rigid nodal mounts which axially and radially support said horn; and
    a housing member surrounding said acoustical tool having at least one key;
    wherein said key of said weld tip sits in a keyway of the horn; and a key in said housing sits in a keyway of the horn.

17. The ultrasonic welder of claim 16, wherein the acoustical tool is a full wave acoustical tool.

18. The ultrasonic welder of claim 16, wherein the housing further comprises bushing which exerts axial forces on the horn.

19. The ultrasonic welder of claim 18, wherein the bushing exerts force on a face of the nodal mount converting some of the axial force into radial force.

* * * * *